United States Patent [19]

York

[11] Patent Number: 4,681,145
[45] Date of Patent: Jul. 21, 1987

[54] APPARATUS FOR REMOVING TREE STUMPS

[76] Inventor: Norman N. York, 61671 Finrock, Pasadena, Tex. 77506

[21] Appl. No.: 928,989

[22] Filed: Nov. 10, 1986

Related U.S. Application Data

[63] Continuation-in-part of Ser. No. 758,167, Jul. 22, 1985, Pat. No. 4,621,668, which is a continuation-in-part of Ser. No. 581,917, Feb. 21, 1984, Pat. No. 4,530,385.

[51] Int. Cl.[4] .................................................. B27L 1/00
[52] U.S. Cl. ...................................... 144/2 N; 37/2 R; 144/176; 241/278 R
[58] Field of Search .................... 144/2 N, 176; 37/92, 37/189, 2 R, 91; 241/101.7, 278 R

[56] References Cited

U.S. PATENT DOCUMENTS

| | | | |
|---|---|---|---|
| 2,887,134 | 5/1959 | Bartlett | 144/2 N |
| 2,912,022 | 11/1959 | Verploeg et al. | 144/2 N |
| 3,911,979 | 10/1975 | Rousseau | 144/2 N |
| 4,530,385 | 7/1985 | York | 144/2 N |

Primary Examiner—W. D. Bray
Attorney, Agent, or Firm—Gunn, Lee & Jackson

[57] ABSTRACT

A tractor supported and driven mechanism for removing tree stumps which causes linear movement of a rotary cutter disk for milling away stumps from the side portions thereof is disclosed. The mechanism incorporates a frame structure having a hydraulically driven slide supported and guided by parallel structural members of the frame. The cutter disk is rotatably supported on the slide structure and is driven by the power take-off of the tractor by means of an elongated non-circular drive shaft which is received in driving engagement by a central non-circular drive opening of the cutter. The cutter disk is movable along the length of the non-circular drive shaft while maintaining driving engagement therewith. The hydraulic system of the apparatus is a closed loop system independent of the tractor hydraulics.

17 Claims, 5 Drawing Figures

APPARATUS FOR REMOVING TREE STUMPS

RELATED APPLICATIONS

This application is a continuation-in-part application of U.S. Ser. No. 758,167 filed July 22, 1985, now U.S. Pat. No. 4,621,688, which is a continuation-in-part application of U.S. Ser. No. 581,917, filed Feb. 21, 1984, now U.S. Pat. No. 4,530,385, both of which are incorporated by reference herein.

FIELD OF THE INVENTION

This invention relates generally to devices for removing tree stumps and, more particularly, is directed to a tree stump removal apparatus which is supported by the standard three point hitch of a tractor and is driven by the tractor power take-off, but incorporates a hydraulic supply system which is independent of the tractor hydraulic system.

BACKGROUND OF THE INVENTION

After trees have been cut, such as during tree harvesting operations or land clearing operations, there typically remains a section of tree stem extending above the surface of the ground. This section of the tree stem, typically referred to as a tree stump, results due to cutting of the tree at a level above the ground where the trunk or stem of the tree begins to taper outwardly to the root portion thereof. In many cases, tree stumps are left for natural environmental decomposition (such as weather, insects and the like). Tree stumps are also removed by explosives, although this is a dangerous and expensive practice.

Should it become desirable to use the ground surface before the tree stumps have time for natural decomposition, the tree stumps can present a hazard to the intended user. It may, therefore, become desirable to accomplish efficient removal of the tree stumps to a level at or slightly below the grade level of the ground without causing undue disturbance of the ground, such as would occur during stump removal by such mechanical implements as dozers, or by blasting, etc.

THE PRIOR ART

As is clear from a review of the prior art, many different types of stump removers have been developed. For the most part, these devices are of complicated and expensive construction. The stump removal machine of Bartlett (U.S. Pat. No. 2,887,134) and Pickel (U.S. Pat. No. 3,732,905) are supported by the three-point hitch structure of a tractor and driven by the power take-off system of the tractor. U.S. Pat. No. 2,912,022 of Ver Ploeg, et al, shows a tractor drawn wheel mounted stump cutter device. U.S. Pat. No. 2,927,613 of Franzen, et al shows a tractor supported stump cutter having plural saw blades for cutting of the stump. U.S. Pat. No. 3,028,691 of Jeffres discloses a tractor-supported device having a chain-type cutter driven in rotary manner. Other stump cutting devices of interest are disclosed by U.S. Pat. Nos. 3,044,509 of Kehler, 3,308,860 of Deshano, 3,568,740 of Speakman, 3,911,979 of Rousseau, and 4,271,879 of Shivers, Jr., et al.

SUMMARY OF THE INVENTION

Accordingly, it is a primary feature of the present invention to provide novel stump removal apparatus which may be supported, raised, lowered and driven by a conventional tractor having a three-point hitch.

It is also a feature of this invention to provide novel tree stump removal apparatus which is capable of efficiently reducing tree stumps to small size debris such as saw dust and wood chips which need not necessarily be transported from the stump removal site.

It is an even further feature of this invention to provide novel tree stump removal apparatus which may be simply and efficiently controlled for removal of tree stumps to the grade level of the ground or to grade levels either below or above ground level as desired by the user.

It is an important feature of this invention to provide novel tree stump removal apparatus which is supported by the three-point hitch of a standard tractor and is driven by the power take-off system of the tractor, thus minimizing the mechanical requirements and expense of the mechanism.

Is is also an important feature of this invention to provide novel tree stump removal apparatus incorporating a hydraulic system independent of the tractor hydraulic system.

It is an even further feature of this invention to provide novel tree stump removal apparatus which may be simply and efficiently stored in readiness for use.

Briefly, tree stump removal apparatus constructed in accordance with the present invention incorporate a frame structure adapted for generally horizontal positioning relative to the ground surface and forming a pair of generally parallel elongated guide members which comprise a portion of the frame structure. A slide structure is provided with guide channels at opposite sides thereof for guiding engagement with the elongated guide members of the frame. A hydraulic cylinder is fixed to the frame structure with an operating shaft thereof in driving connection with the slide and thus being adapted to impart linear movement to the slide upon being energized through control of the hydraulic system. A rotary cutter disk having tree trunk milling or cutting teeth removalbly fixed thereon is rotatably supported on the frame structure and is, therefore, movable along with the frame. The cutter is adapted to mill or shred away a tree stump from one side thereof as the cutter disk is simultaneously rotated and moved linearly by hydraulically induced movement of the slide structure. The cutter disk is capable of removing the stump to the level of the ground or to grade levels either above or below the level of the ground, depending upon the desires of the user.

The frame structure incorporates a plurality of jack stands which are extended downwardly to elevate the frame from the ground for storage or positioned upwardly while the apparatus is being supported by a tractor. This feature permits lowering of the frame structure to ground level for removal of stumps below ground level since the outer periphery of the cutter disk extends below the lower level of the frame structure. The frame also incorporates vertical lifting eye structure enabling it to be lifted by lifting hooks such as for handling or transportation without attachment to a tractor.

The rotary cutter disk is in the form of a metal plate having a plurality of wood cutting or shredding teeth extending from one side and the peripheral portion thereof. The cutter disk is rotated by the power take-off system of the tractor while, at the same time, it is moved linearly against the side portion of the tree stump. The cutter disk is rotatably supported by a bearing secured to the slide structure. A non-circular drive opening is defined by the cutter which receives an elongated non-circular drive shaft extending across a tree stump opening formed by the frame member. The elongated drive shaft is rotated by the power take-off system of the tractor and maintains its driving relation with the rotary cutter during linear movement of the slide by the hydraulic system. A very simple, low cost disk drive system is, therefore, provided which minimizes the total cost of the stump removal apparatus. The disk is enclosed by a protective housing having a suitable outlet for discharge of particles removed from the stump. A collection apparatus is provided at the housing discharge for collection of the stump particles for disposal away from the stump removal site.

The hydraulic system of the stump removal apparatus is independent of the tractor hydraulic system. The hydraulic system of the apparatus is a closed loop system including a pair of double acting cylinders mounted to the frame structure. The fluid reservoir or sump is formed by the frame structure which include a fluid fill spout extending upwardly therefrom.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

DETAILED DESCRIPTION OF THE PREFERRED EMBODIMENT

Figure 1:
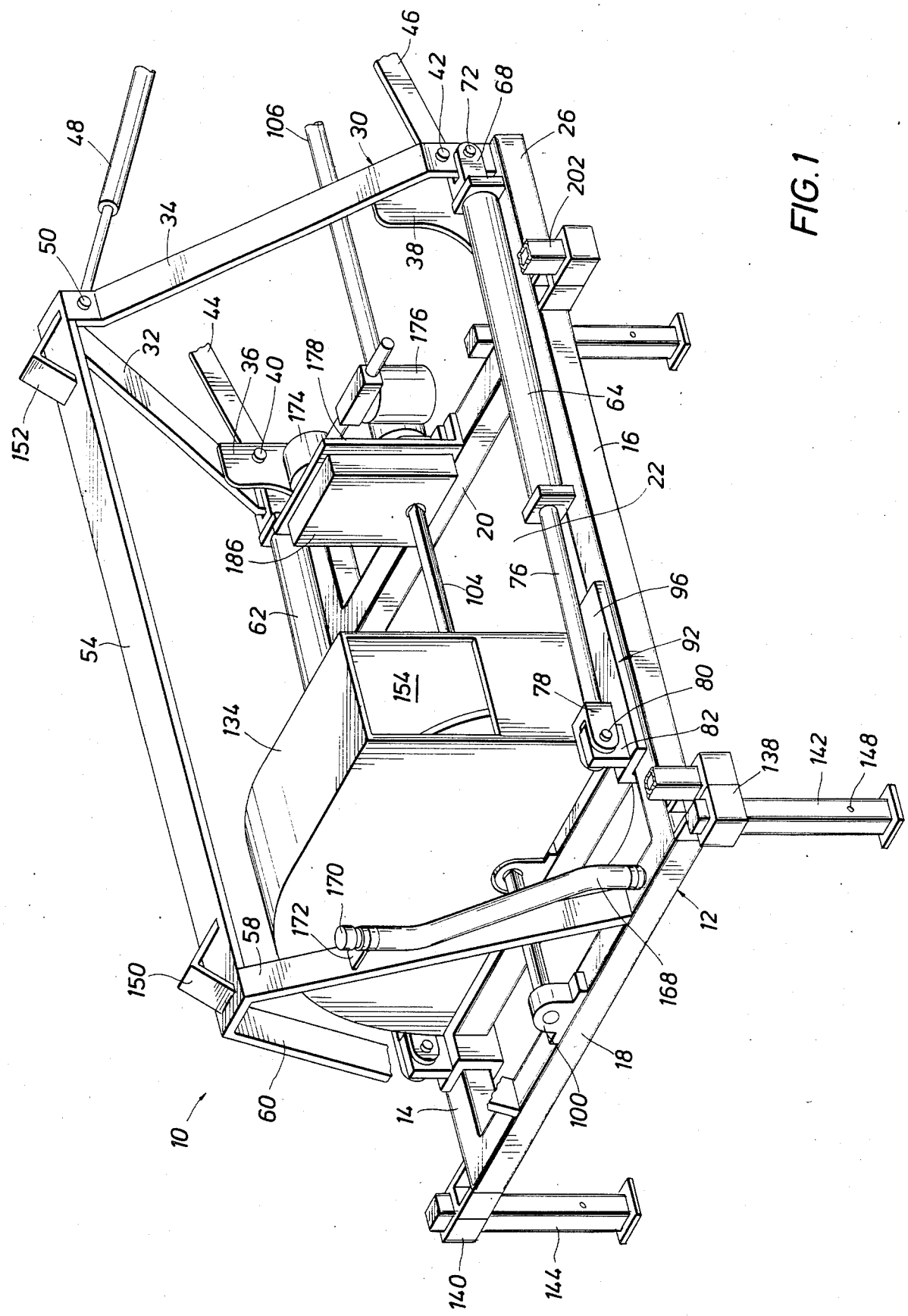
FIG. 1 is a perspective view illustrating tractor supported and operated stump removal apparatus constructed in accordance with the present invention.
Figure 2:
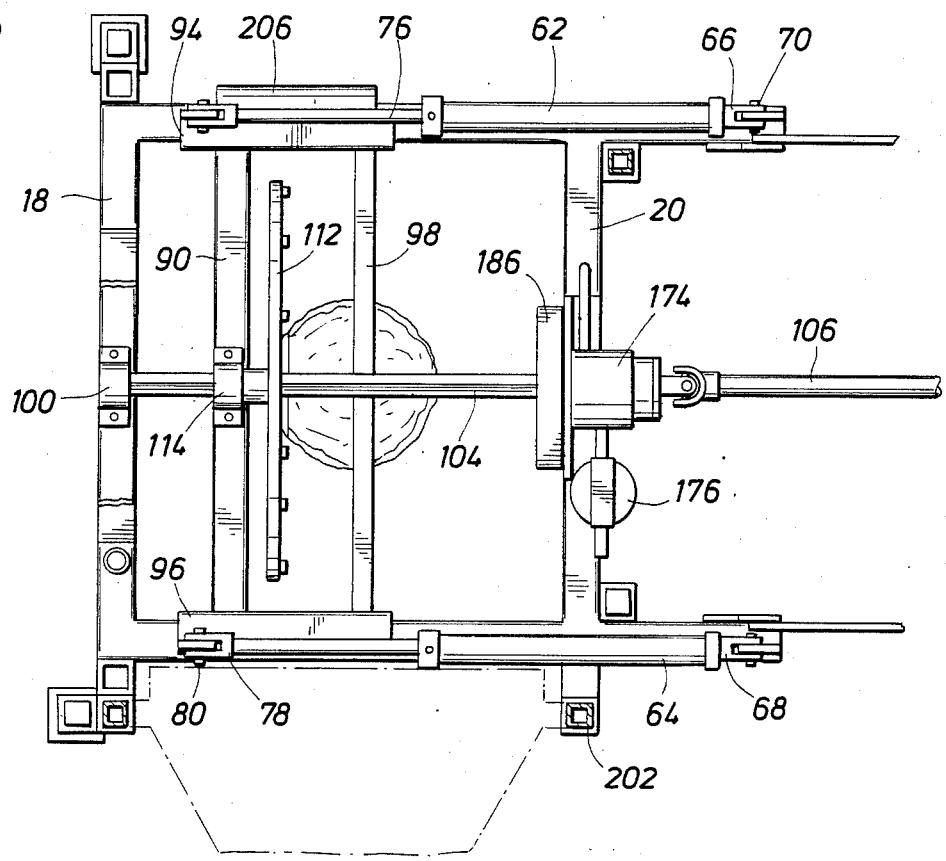
FIG. 2 is a partially broken away top plan view of the tree stump removal apparatus.
Figure 3:
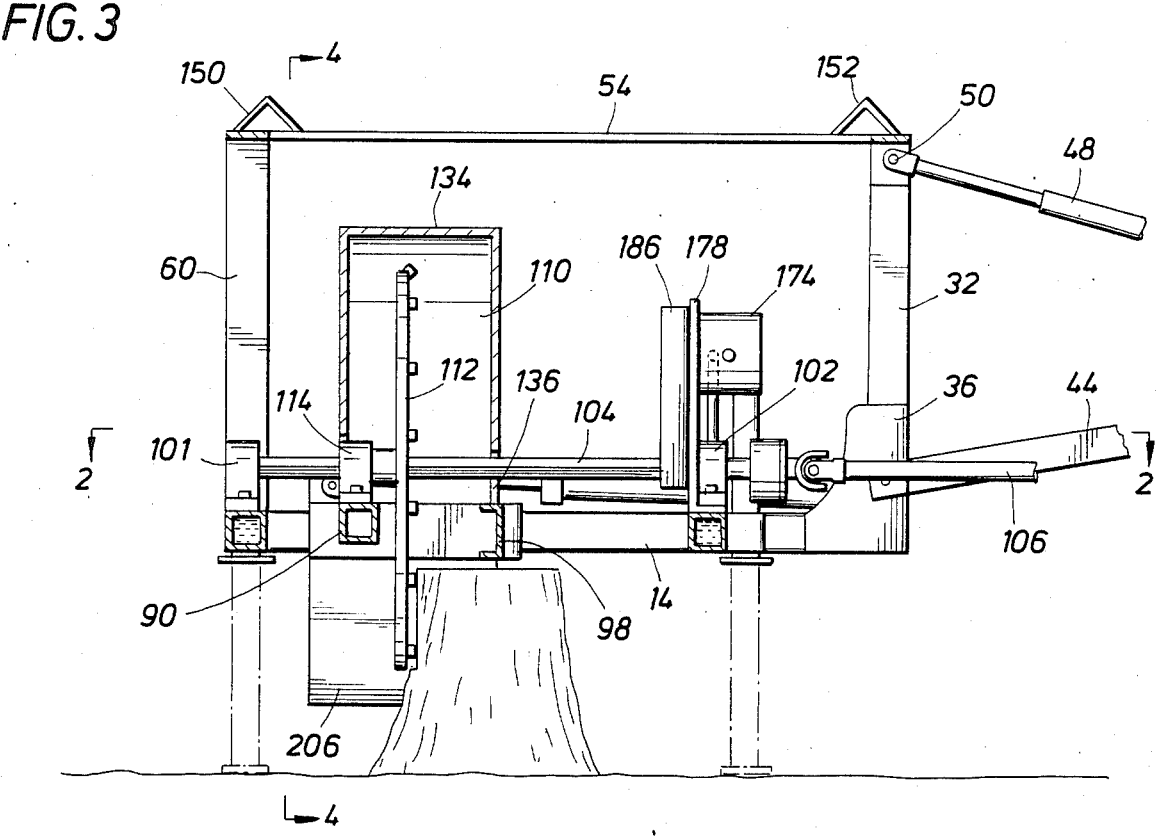
FIG. 3 is a sectional view of the tree stump removal apparatus.

Referring now simultaneously to FIGS. 1-3 of the drawings, a mechanism for removing tree stumps is provided generally at 10 which incorporates a tractor supported frame structure illustrated generally at 12. A major portion of the frame structure is of generally rectangular form and is defined by a pair of elongated structural frame members 14 and 16 which are disposed in substantially parallel relation and which are interconnected by means of a pair of transverse structural members 18 and 20. The frame members 14, 16, 18 and 20 cooperate to define an opening 22. The parallel structural members 14 and 16 define support extensions 26 to which are connected a three-point hitch assembly illustrated generally at 30. The hitch assembly includes a pair of inclined load transmitting member 32 and 34 having bifurcated lower portions 36 and 38 defining clevis-like connections. A pair of connecting pins 40 and 42 extend through side members of the clevis structure for connection of hitch operating bars 44 and 46 of a tractor to the three-point hitch structure. The hitch operating bars form a part of the tractor hitch structure as does the operating bar member 48. A connecting pin 50 extends through apertures in the upper parallel extremities of the load transmitting member 32 and 34, thus providing for connection of the free extremity of the lift bar 48 of the tractor to the upper portion of the three-point hitch assembly. A force transmitting member 54 is provided to transmit forces from the three-point hitch to the frame structure of the stump removal apparatus. Inclined structural members 58 and 60 are secured at the upper extremities thereof to the central force transmitting member 54 and are positioned in downwardly diverging manner with the lower extremities thereof secured to the transverse structural frame member 18.

The hydraulic system of the tree stump removal apparatus 10 includes a pair of hydraulic cylinders 62 and 64 mounted on the frame structure 12 above frame members 14 and 16, respectively. The rear ends of the cylinders 62 and 64 define clevis-like connections 66 and 68. A pair of connecting pins 70 and 72 extend through side members of the clevis connections 66 and 68, thereby connecting the rear end of the cylinders 62 and 64 to the lower ends of the members 32 and 34.

Each of the cylinders 62 and 64 define an internal, cylindrical cavity which is divided by a piston 74. A piston rod 76 is connected to the piston 74. The pistion rods 76 extend out of the forward ends of the cylinders 62 and 64. The free end of each piston rod 76 includes a clevis connection 78 connecting the piston rod 76 to a slide structure of the apparatus shown generally at 92. The clevis connection 78 is connected by a pin 80 to an upstanding connecting flange 82 on the slide structure 92. Thus, as the hydraulic cylinders 62 and 64 are energized responsive to selection by the tractor operator, the piston rod 76 of the cylinders 62 and 64 impart linear movement to the slide structure 92. The slide structure incorporates a pair of guide members 94 and 96 which are formed by elongated channel members having a C-shaped cross-sectional configuration with upper and lower flanges receiving the elongated structural members 14 and 16 in guiding relation therebetween. The slide structure may also include a spaced transverse structural member 98 at the opposite side thereof which is also interconnected with the guide members 94 and 96.

A pair of bearing assemblies 100 and 102 are fixed in aligned relation to the transverse structural members 18 and 20 of the framework in the manner shown in FIGS. 1 and 3. These bearing assemblies provide rotatable support for a non-circular drive shaft 104 which is rotated by a power take-off shaft 106 extending from the power take-off of the tractor. The drive shafts 104 and 106 are interconnected by means of a universal joint in order to accommodate any shaft misalignment that might be present.

The slide assembly 92 forms an opening 110 within which is located a circular cutter plate or disk 112. The cutter disk 112 is rotatably supported by means of a bearing assembly 114 secured to a transverse structural member 90 of the slide structure assembly. Thus, the bearing assembly 114 and the disk 112 move linearly as the slide assembly 92 is moved upon energization of the hydraulic cylinders 62 and 64. The bearing support assembly 114 for the cutter disk defines a non-circular drive opening which receives the non-circular drive shaft 104 in linearly movably, non-rotatable driving relation therein. As the drive shaft 104 is rotated, the cutter disk 112 is caused to rotate. As the slide assembly 92 is moved linearly by the hydraulic cylinders 62 and 64, the drive shaft 104 does not move linearly, but rather merely continues its rotary movement responsive to its directly driven relationship with the drive shaft 106 of the tractor power take-off shaft. The rotary cutter disk 112, however, is advanced for cutting of a tree stump as the slide assembly 92 is advanced by the hydraulic cylinder 62 and 64. It shall be borne in mind that the hydraulic cylinder 62 and 64 incorporate hydraulic supply lines shown schematically in FIG. 5, which form part of the hydraulic supply system of the apparatus 10. By appropriate manipulation of an actuating valve, the hydraulic cylinders and, consequently, the slide assembly 92 will be actuated in a selected forward or rearward direction, as will be described in greater detail herein.

A protective housing 134 is secured to the guide members 94 and 96 of the slide assembly and may also be secured to one or both of the transverse structural members 90 or 98 as desired. The side plates of the housing structure form openings such as shown at 136 through which the non-circular drive shaft 104 extends. The housing structure, therefore, travels along with the movable slide assembly and thus provides a protective enclosure about the rotating cutter disk 112. The housing may be removably connected to the slide assembly 92 by hinge type receptacles (not shown in the drawings) which are retained in the assembly by hinge pins. The housing can be pivoted relative to the slide assembly 92 by removing one of the hinge pins, or removed from the slide assembly 92 after both of the hinge pins have been removed.

Figure 4:
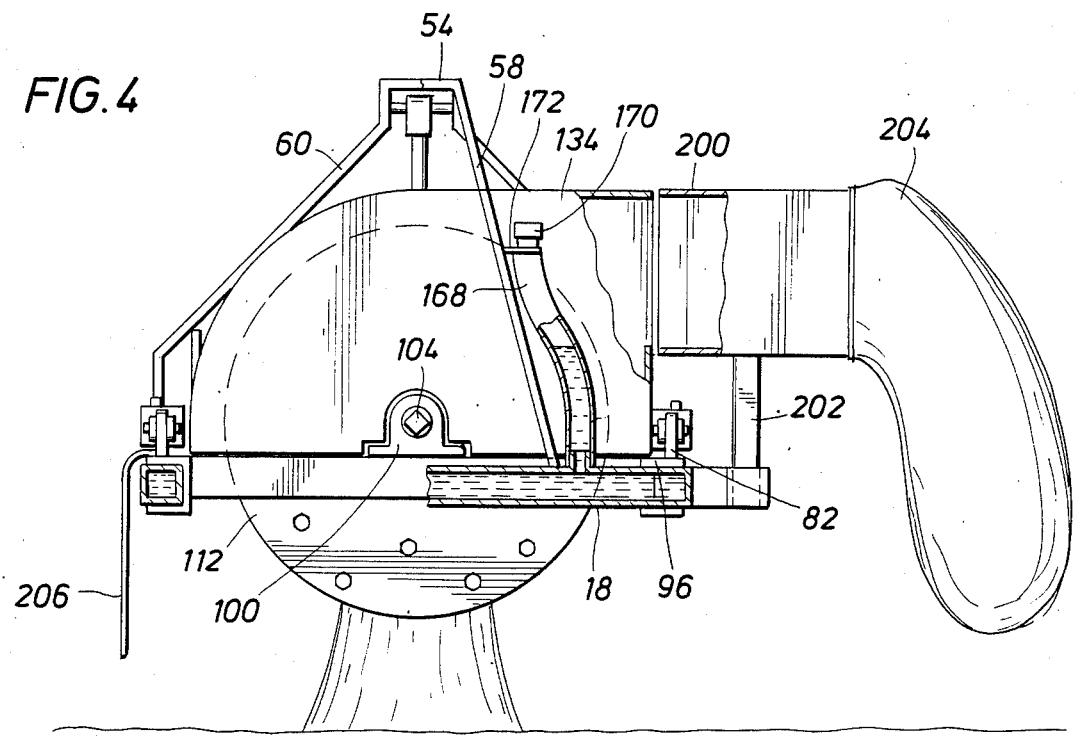
FIG. 4 is an end view of the tree stump removal apparatus, partially broken away, and showing the fluid reservoir of the hydraulic system.
Figure 5:
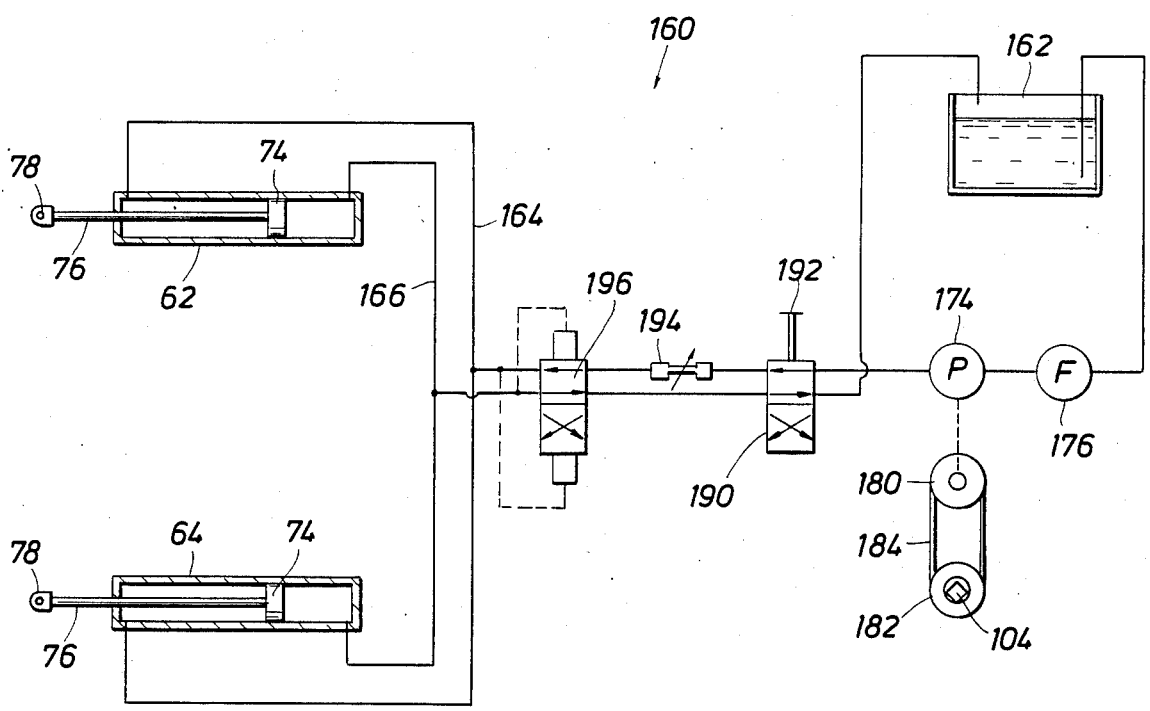
FIG. 5 is a schematic representation of the hydraulic system of the tree stump removal apparatus.

Referring now to FIG. 5, the hydraulic system of the tree stump removal apparatus is shown in schematic form and generally identified by the reference numeral 160. The hydraulic system 160 is a closed looped system independent from the tractor hydraulic system. The hydraulic system 160 includes the cylinders 62 and 64 connected to a sump or reservoir 162 by hydraulic supply lines 164 and 166. The reservoir 162 is formed by the frame structure of the apparatus. The frame member 14, 16, 18, and 20 are hollow, as shown in the sectional views of FIGS. 3 and 4. The hollow frame members define a fluid reservoir having sufficient capacity to hold the fluid requirements of the system. A fill spout 168 extends upwardly from the frame member 18. The upper end of the fill spout 168 is closed by a cap 170 and anchored to the inclined frame member 58 by connecting member 172. The fill spout 168 may be fabricated of a hard, clear plastic material so that the fluid level in the system may be easily observed, and additional hydraulic fluid added as required.

The hydraulic system 160 includes a pump 174 and filter 176 mounted to a mounting plate 178. The mounting plate 178 is welded or otherwise mounted to the structural member 20 and supports the bearing assembly 102. The non-circular drive shaft 104 extends through the mounting plate 178, as shown in FIG. 3.

The pump 174 is mounted to the mounting plate 178 and includes a drive shaft extending therethrough. The pump drive shaft includes a gear 180 mounted thereon which is operatively connected to a gear 182 mounted to the non-circular drive shaft 104. As the drive shaft 104 is rotated, the gear 180 is caused to rotate by a connecting drive chain or belt 184, thereby activating the pump 174. The pump 174 drive mechanism is enclosed by a cover 186 mounted to the mounting plate 178.

The hydraulic system 160 includes an actuating valve 190 which is mounted to the tractor within easy reach of the tractor operator. A handle 192 permits the tractor operator to operate the system and select the direction of movement of the slide assembly 92. A restrictor valve 194 is incorporated in the system. A double relief valve 196 is provided as an added safety feature to prevent excessive stress on the cutter 112. The relief valve 196 automatically reverses the direction of fluid flow in the event the cutter 112 stalls or is in a bind so that it does not smoothly move across the stump. In such a situation, the cutter 112 is automatically forced away from the stump so that the tree stump removal apparatus may be repositioned for again engaging the stump.

Referring now to FIG. 4, a collection apparatus for the stump particles is shown. The collection apparatus comprises a frame removably mounted on the frame structure 12. The collection apparatus frame comprises a generally rectangular frame structure 200 including a pair of legs 202 extending downwardly therefrom. The legs 202 are received in receptacles formed in the frame structure 12 for supporting the collection apparatus opposite the discharge opening of the housing 134. The frame 200 defines an elongate opening so that stump particles are discharged into a bag 204 as the housing 134 advances when cutting or removing a stump. The bag 204 is maintained on the frame structure 200 by slipping the mouth of the bag 204 about the frame 200 and tying the bag thereon.

For additional safety, a downwardly extending flap 206 is fastened to the slide assembly 92 on the side opposite the discharge opening of the housing 134. The flap 206 acts as a shield or retaining member for any stump particles which may be thrown from under the stump removal apparatus upon engagement of the cutter disk with a stump.

While the apparatus shown in the drawing is disconnected from a tractor assembly, it is capable of being stored in an elevated position above ground level to thus provide it with a degree of protection from the ground environment and to prevent the cutter disk 112 from engaging the ground. A plurality of jack receptacles 138 and 140 are secured to respective structural members of the frame. Each of these receptacles receives a jack stand such as shown at 142 and 144 which is capable of selective positioning in either an extended position as shown in FIG. 1, or a retracted position. Each of the jack stands defines one or more pin apertures 148 which receive pins to lock the jack stands in either the extended or retracted position as desired. In the extended position, as shown in FIG. 1, the jack stands rest on the ground and therefore support the frame structure 12 in an elevated position. During use, the jack stands may be retracted, thus enabling the frame to be lowered into contact with the ground for positioning a cutter disk such that it enters the ground to its fullest depth to thereby facilitate removal of a stump below ground level. The degree of disk penetration below the level of the ground can be effectively controlled through positioning of the jack stands.

To further facilitate handling, the upper transverse structural member 54 is provided with lifting eyes 150 and 152 which permit movement of the stump removal mechanism by any suitable lifting apparatus such as for truck loading for relocation of it when a tractor is not available or when the apparatus is to be transported significant distances.

OPERATIONS

For stump removal operations, the connecting bars 44, 46, and 48 of a conventional tractor power take-off interconnected with the three-point hitch structure by means of the connecting pins 40, 42 and 50. The jack stands are then shifted to the retracted positions thereof, such as shown in FIGS. 3 and 4, thereby permitting the frame 12 to be lowered into contact with the ground if desired. The tractor will then transport the mechanism in elevated position above the ground and will sufficiently raise it to clear a stump intended for removal. The tractor will then be backed up to position the opening 22 of the frame structure over the stump. Thereafter, the tractor lift will be lowered, thus lowering the frame to a suitable height relative to the stump. In this position, the hydraulic cylinders 62 and 64 will be so energized as to position the slide assembly 92 at its left-most, retracted position. The power take-off of the tractor will then be energized, thereby rotating the drive shaft 106 and thus causing rotation of the driven shaft 104. The driving interconnection between the non-circular shaft 104 and the cutter causes the cutter plate 112 to rotate while bing supported by its bearing assembly 114.

At this time, the hydraulic cylinders 62 and 64 will be energized by manipulation of the actuating valve 190, causing the piston rods 76 to move forwardly toward the tractor and thereby driving the slide assembly 92 and the rotary cutter disk 112 toward the stump. As the cutter disk 112 advances, the cutter teeth engage the stump and begin cutting it away. The sawdust and wood chips that are removed from the stump will be ejected through an opening 154 of the protective housing 134 to thus insure that the operator of the tractor is not in danger of flying wood chips and other debris. If desired, the removable collection apparatus 200 may be mounted to the frame structure 12 opposite the opening 154 to receive the sawdust and woodchips that are thus developed. The hydraulic cylinders and piston rods are of sufficient length that a stump will be completely cut away in a single pass. In the event the stump is of greater height than the cutting depth of the cutter disk after an initial pass, cutting away the upper portion of the stump, the slide assembly 92 will again be retracted by the hydraulic cylinders. Thereafter, the frame will be lowered and the hydraulic cylinders energized to move the slide assembly and the cutter across the stump again, thus removing the stump to a lower level, including below ground level, if desired. If desired, the rotating stump cutter disk may be inserted into the ground while rotating by simultaneously lowering the frame toward the surface of the ground. In fact, the frame may be lowered into contact with the ground, if desired, and the hydraulic cylinders may be energized to cause cutter traversing below ground level. Obviously the rotating cutter will dig a trench below ground which, of course, must be filled after the stump has been removed if a trench in the ground is undesirable.

It is, therefore, seen that this invention is one well adapted to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set for the or shown in the accompanying drawings are to be interpreted as illustrative and not in any limiting sense.

What is claimed is:

1. Tractor supported and operated stump removal apparatus, comprising:
    (a) a frame structure adapted to be supported, raised, and lowered by a hitch structure of the tractor;
    (b) slide means being positioned for guided reciprocal movement on said frame structure;
    (c) hydraulic means for imparting linear reciprocal movement to said slide means, said hydraulic means being independent of tractor hydraulics;
    (d) a non-circular drive shaft being mounted for rotary movement on said frame structure and adapted to be driven by the power take-off of the tractor; and
    (e) a rotary cutter element being rotatably mounted on said slide means and movable along with said slide means, said rotary cutter element having means providing sliding, non-rotatable relation with said drive shaft, whereby said cutter element is rotated by said drive shaft and is capable of simultaneous linear movement.

2. The apparatus of claim 1, wherein said frame structure comprises interconnected, hollow, frame members, said frame members cooperating to form a fluid reservoir for said hydraulic means.

3. The apparatus of claim 2, including an upstanding fill spout extending from one of said frame members.

4. The apparatus of claim 1, including valve actuating means mounted on said tractor for actuating said hydraulic means to impart linear reciprocal movement to said slide means.

5. The apparatus of claim 1, wherein said hydraulic means includes a double relief valve for automatically switching the direction of hydraulic fluid flow.

6. The apparatus of claim 1, wherein said hydraulic means includes pump means operatively connected to said drive shaft, whereby said pump means is activated upon rotation of said drive shaft.

7. The apparatus of claim 1, including a removable frame mounted on said frame structure, said removable frame including a bag mounted thereon for receiving stump debris discharged by said rotary cutter element.

8. The apparatus of claim 7, wherein said removable frame includes an elongate opening facing said cutter element, said bag being mounted on said removable frame about said elongate opening for receiving string debris discharged by said notary cutter element.

9. The apparatus of claim 1, including a downwardly extending shield mounted on said slide means for preventing the discharge of stray stump particles from under said frame structure.

10. A tractor supported and driven apparatus for removing tree stumps, comprising:
    (a) a frame structure adapted for generally horizontally positioning relative to the ground surface and forming spaced elongated guide members;

(b) three-point hitch means for connection of said frame structure to implement lifting apparatus of a tractor;

(c) a slide structure being movably positioned in sliding engagement with said elongated guide members;

(d) hydraulic means being supported by said frame structure and having linear driving connected with said slide structure, said hydraulic means being independent of tractor hydraulics; and (e) a rotary cutter disk being rotatably supported by said slide structure and adapted to cut away a stump from one side thereof as said cutter disk is rotated and moved linearly responsive to linear movement of said slide structure, said cutter disk extending to a level below said frame being capable of removing said stump to a grade below ground level, said cutter disk being independently rotated by the power-take-off of said tractor and independently moved in linear manner upon linear movement of said frame structure by said hydraulic means.

11. The apparatus of claim 10, wherein said frame structure comprises interconnected, hollow, frame members, said frame members cooperating to form a fluid reservoir for said hydraulic means.

12. The apparatus of claim 10, including valve actuating means mounted on said tractor for actuating said hydraulic means to impart linear reciprocal movement to said slide means.

13. The apparatus of claim 10, wherein said hydraulic means includes a double relief valve for automatically switching the direction of hydraulic fluid flow.

14. The apparatus of claim 10, wherein said hydraulic means includes pump means operatively connected to the power take-off of the tractor, whereby said pump means is activated upon rotation of the tractor power take-off.

15. The apparatus of claim 10, including a removable frame mounted on said frame structure, said removable frame including a bag mounted thereon for receiving stump debris discharged by said rotary cutter element.

16. The apparatus of claim 15, wherein said removable frame includes an elongate opening facing said cutter element, said bag being mounted on said removable frame about said elongate opening for receiving stump debris discharged by said rotary cutter element.

17. The apparatus of claim 10, including a downwardly extending shield mounted on said slide means for preventing the discharge of stray stump particles from under said frame structure.

* * * * *